US006052648A

United States Patent [19]
Burfeind et al.

[11] Patent Number: 6,052,648
[45] Date of Patent: Apr. 18, 2000

[54] METHOD AND SYSTEM FOR DISPLAY OF WEATHER-RELATED INFORMATION

[75] Inventors: Craig R. Burfeind, Chanhassen; Christopher F. Ebbert, St. Paul, both of Minn.; Douglas P. Kruhoeffer, Winnetka, Ill.; Peter Resch, Albertville, Minn.

[73] Assignee: EarthWatch Communications, Inc., Minnetonka, Minn.

[21] Appl. No.: 08/833,841

[22] Filed: Apr. 10, 1997

Related U.S. Application Data

[60] Provisional application No. 60/015,421, Apr. 12, 1996.

[51] Int. Cl.[7] .................................................. G06F 169/00
[52] U.S. Cl. .............................................................. 702/3
[58] Field of Search ...................... 702/3, 4, 5; 348/598, 348/599, 592

[56] References Cited

U.S. PATENT DOCUMENTS

| | | | |
|---|---|---|---|
| 3,769,442 | 10/1973 | Heartz et al. | 35/10.4 |
| 4,017,985 | 4/1977 | Heartz | 35/10.4 |
| 4,493,647 | 1/1985 | Cowdrey | 434/2 |
| 4,520,506 | 5/1985 | Chan et al. | 382/56 |
| 4,667,199 | 5/1987 | Roberts | 342/169 |
| 4,682,160 | 7/1987 | Beckwith, Jr. et al. | 340/729 |
| 4,727,373 | 2/1988 | Hoover | 342/25 |
| 4,807,158 | 2/1989 | Blanton et al. | 364/521 |
| 4,914,607 | 4/1990 | Takanashi et al. | 364/521 |
| 4,970,666 | 11/1990 | Welsh et al. | 364/522 |
| 5,111,400 | 5/1992 | Yoder | 364/424.01 |
| 5,111,460 | 5/1992 | Botzenhardt, et al. | 371/29.1 |
| 5,135,397 | 8/1992 | Yen | 434/2 |
| 5,255,190 | 10/1993 | Sznaider | 364/420 |
| 5,345,313 | 9/1994 | Blank | 348/598 |
| 5,379,215 | 1/1995 | Kruhoeffer et al. | 364/420 |
| 5,469,536 | 11/1995 | Blank | 345/431 |
| 5,696,892 | 12/1997 | Redmann et al. | 345/425 |

OTHER PUBLICATIONS

"Intensity and Color", pp. 583–622.

"Modeling Military Maneuvers", *Compuer–Aided Engineering*, 16, (Mar. 1989).

Agui, T., et al., "A Method of Reconstructing 3D Mountainous Shapes from Contours", *Systems and Computers in Japan*, 18, Trans. from Denshi Tsushin Gakkai Ronbunshi, 69–D, pp. 1905–1912 (Dec. 1986), 33–40, (1987).

Coquillart, et al., "Shaded Display of Digital Maps", *IEEE CG&A*, 35–42, (Jul. 1984).

DeFanti, T., et al., "Visualization: Expanding Scientific and Engineering Research Opportunities", *Computer*, 12–25, (Aug. 1989).

Dowman, "The Prospects for Topographic Mapping using SPOT Data", pp. 1163–1172.

Dungan, Jr., "A Terrain and Cloud Computer Image Generation Model", *Proc: Association for Computing Machinery*, 143–147, (1979).

Foley, J., et al., "Ch. 13: Surface Fitting and Surface Displaying", In: *Fundamentals of Interactive Computer Graphics*, Addison–Wesley Pub., 299–313.

Ganapathy, et al., "A New General Triangulation Method for Planar Contours", *Computer Graphics*, 16, 69–75, (Jul. 1982).

(List continued on next page.)

*Primary Examiner*—Donald E. McElheny, Jr.
*Attorney, Agent, or Firm*—Nikolai, Mersereau & Dietz, P.A.

[57] ABSTRACT

A method and a system for the display of weather-related information are described. The display is interactive, three-dimensional, and weather forecaster-immersive. A three-dimensional image from a computer is integrated with a video feed source of a weather forecaster preferably in real time, so that the resulting image is a weather forecaster who is inside or a part of the visualized weather information. The integrated images of the forecaster and the weather display are preferably generated quickly, so that they appear animated when shown in succession.

35 Claims, 11 Drawing Sheets

OTHER PUBLICATIONS

Gardner, "Visual Simulation of Clouds", *SIGGRAPH*, 19, San Francisco, pp. 297–303, (Jul. 22–26, 1985).

Gelberg, L., et al., "Supercomputing and Graphics in the Earth and Planetary Sciences", *IEEE Compuer Graphics and Applications, Special Issue: Supercomputers for Graphics*, 26–33, (Jul. 1987).

Gugan, et al., "Topographic Mapping from SPOT Imagery", *Photogrammetric Engineering and Remote Sensing*, 54, pp. 1409–1414, (Oct. 1988).

Haber, R., "Scientific Visualization and the Rivers Project at the National Center for Supercomputing Applications", *Computer*, 84–89, (Aug. 1989).

Hasler, A., et al., "Meteorological Data Fields "In Perspective"", *Bull. American Meteorological Society*, 66, 795–801, (Jul. 1985).

Hibbard, et al., "Visualizing Large Data Sets in the Earth Sciences", *Computer*, pp. 53–57, (Aug. 1989).

Jones, L., "Silicon Graphics and Imaging", *Advanced Imaging*, 38, 43 and 75, (Jul. 1989).

Kaneda, K., et al., "Three Dimensional Terrain Modeling and Display for Environmental Assessment", *Computer Graphics*, 23, pp. 207–214, (Jul. 1989).

Lerberl, et al., "Chasing the Clouds Away", *Computer Graphics World*, pp. 50–52, (Apr. 1987).

Miller, G., "The Definition and Rendering of Terrain Maps", *SIGGRAPH*, vol. 20, Dallas, TX, 39–45, (Aug. 18–22, 1986).

Newman, W., et al., "Ch. 23 Perspective Depth and Ch. II Homogenous Coordinate Techniues", *In: Principles of Interactive Computer Graphics*, Second Ed., McGraw–Hill, pp. 355–367 & 491–50.

Papathomas, T., et al., "Stereo Animation for Very Large Data Bases: Case Study—Meteorology", *IEEE CG&A*, pp. 18–27, (Sep. 1987).

Shoor, "Plotting a New Course with New–Generation GIS", *Computer Graphics Review*, 18,19,22, 24–26, (Nov. 1989).

Szeliski, et al., "From Splines in Fractals", *Computer Graphics*, 23, pp. 51–60, (Jul. 1989).

Ware, C., et al., "Exploration and Virtual Camera Control in Virual Three Dimensional Environments", *Transactions of the Association or Computing Machinery*, pp. 175–183, (1990).

Williams, et al., "Digital Display of Spot Stereo Images", *Cooperative Inst. for Appl. Remote Sensing*, University of Oklahoma, 1–7.

FIG. 12

METHOD AND SYSTEM FOR DISPLAY OF WEATHER-RELATED INFORMATION

RELATED APPLICATIONS

This application claims the benefit of U.S. Provisional Ser. No. 60/015,421, filed Apr. 12, 1996, which is hereby incorporated by reference.

FIELD OF THE INVENTION

This invention relates generally to the display of weather-related information and most particularly to an interactive, weather forecaster-immersive, three-dimensional weather visualization system.

BACKGROUND OF THE INVENTION

In recent years, meteorological information has become increasingly important. Weather information is collected almost instantaneously from numerous sources. For example, weather information can be collected from a multitude of individual sites scattered across the world (for example, airports), various types of weather radar, and various types of weather information collected from satellites.

Typically, this information is used to generate forecasts and to provide up-to-date weather maps. For example, television meteorologists generate simple two-dimensional maps that show high and low pressure zones, various temperatures and other miscellaneous weather-related information. Information from weather radar is typically displayed by overlaying a dimensional map with a radar screen. Similarly, television stations typically display satellite photographic image with a country or state outline. A sequence of photographic or radar images can be shown sequentially to provide weather animation. Relative to the complexity of present day weather collection techniques and the great volume of weather-related information now available, these display techniques are rather simplistic.

One advance in this technology is disclosed in U.S. Pat. No. 5,379,215 ("the '215 patent"), which is hereby incorporated by reference. The '215 patent discloses a weather visualization system in which the weather is visualized in a three-dimensional manner, with a third-person viewpoint such that the system generates weather-related images to provide a "fly by" animation. The '215 patent does not disclose any other weather visualization systems.

SUMMARY OF THE INVENTION

The present invention provides for a method and a system for an interactive, three-dimensional and weather forecaster-immersive display of weather-related information. The invention generates a three-dimensional image using a computer system. The computer system integrates this three-dimensional image with a video feed source of a weather forecaster preferably in real time, so that the resulting image is a weather forecaster who is inside or a part of the three-dimensional image of the weather. The computer system is able to generate a sequence of such integrated images quickly, so that the resulting images appear animated.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Hardware and Software Implementation

Figure 1:
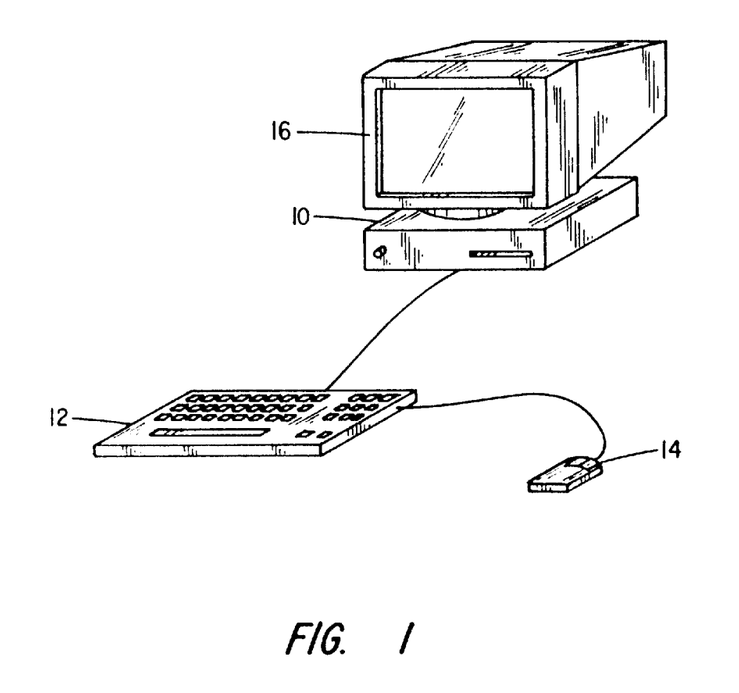
FIG. 1 is a diagram of a typical computer system in conjunction with which an embodiment of the invention may be implemented.

Referring first to FIG. 1, a diagram of a typical computer system in conjunction with which an embodiment of the invention may be implemented is shown. Computer 10 has coupled to it input devices 12 and 14, shown in FIG. 1 as a keyboard and a mouse pointing device, respectively, as well as display device 16. The invention is not particularly limited to a given computer 10. Preferably, computer 10 is a UNIX-based computer known within the art; an exemplary such workstation is available from Silicon Graphics, Inc., of Mountain View, Calif.

Figure 2:
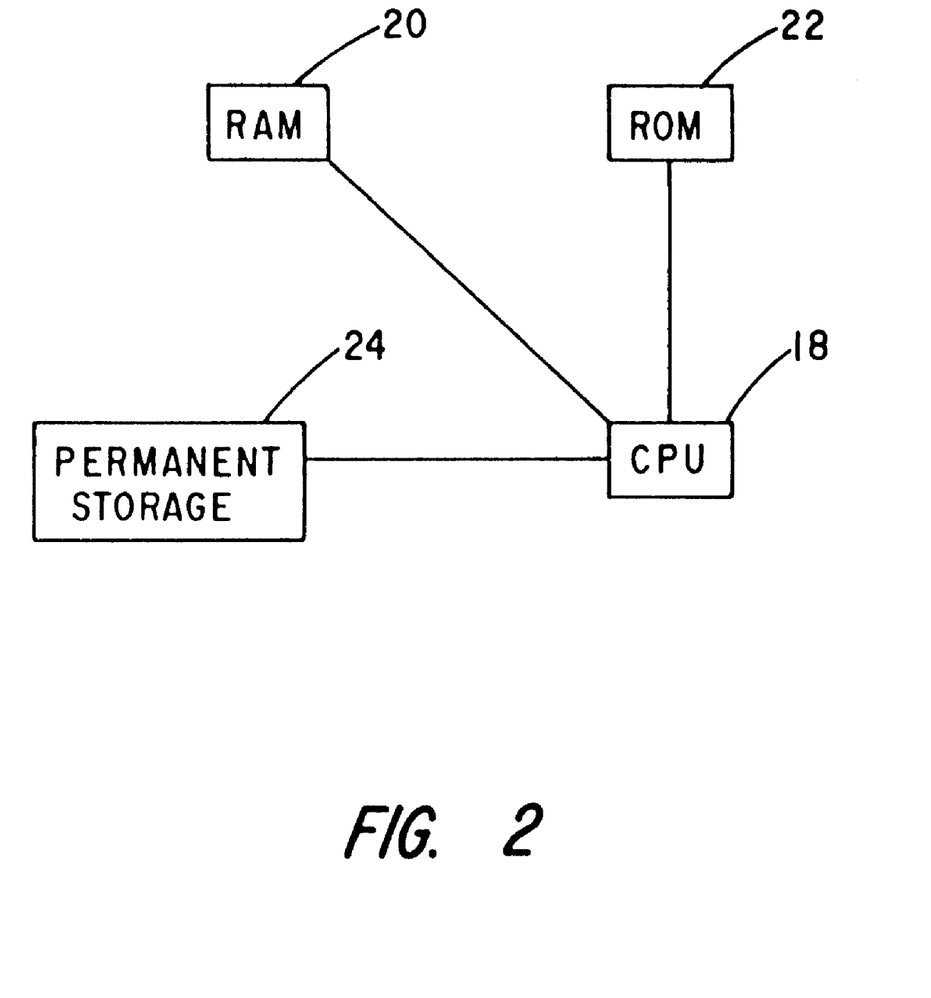
FIG. 2 is a block diagram showing in more detail the typical constituent components of the computer of FIG. 1.

Referring next to FIG. 2, a block diagram of the typical constituent components of the computer of FIG. 1 is shown. That is, computer 10 typically includes at least one processor 18, random-access memory 20, read-only memory 22, and one or more storage devices 24. Such storage devices may include a hard disk drive, a floppy disk drive, a tape storage drive, and an optical disk drive. The invention is not so particularly limited, however. Computers amenable to the invention and their typical constituent components are available in a variety of different configurations.

The invention includes computer software that is executed by the processor(s) 18, preferably from either RAM 20, storage device(s) 24, or both. A commercial embodiment of the software is incorporated within Reality 3D™ software developed and sold by EarthWatch Communications, Inc. of Minnetonka, Minn. The invention is not so particularly limited, however, as those of ordinary skill within the art will appreciate.

Overview

Figure 3:
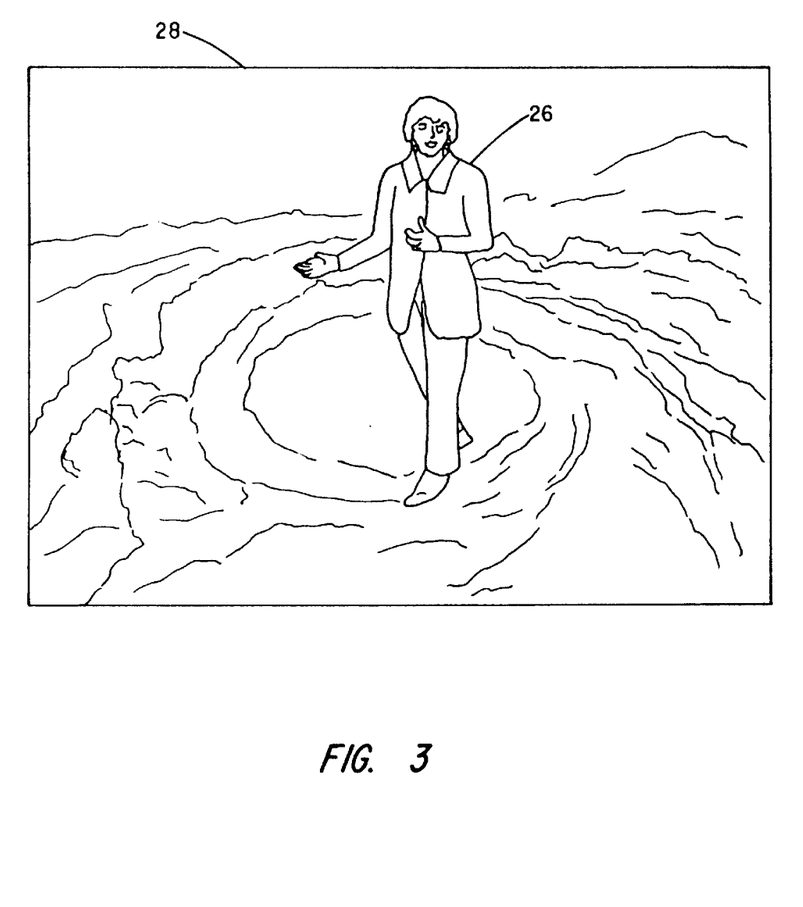
FIG. 3 is an exemplary final display according to one embodiment of the invention.
Figure 4:
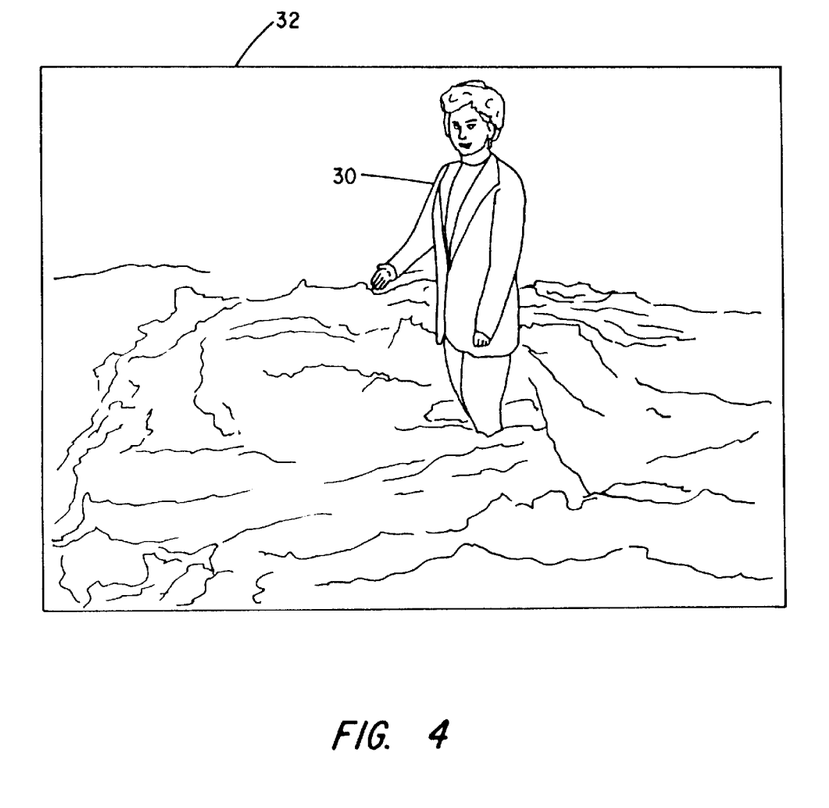
FIG. 4 is a further exemplary final display according to one embodiment of the invention.

The invention provides for a method and a system for an interactive, three-dimensional and weather forecaster-immersive display of weather-related information. Referring to FIG. 3, an exemplary final display according to one embodiment of the invention is shown. Weather forecaster 26 is shown as integrated into weather display 28; more specifically, forecaster 26 is shown as being immersed within display 28. Referring to FIG. 4, a further exemplary final display according to one embodiment of the invention is shown. Weather forecaster 30 is shown as integrated into weather display 32; more specifically, forecaster 32 is shown as having the appearance of entering and becoming a part of weather display 32. Such displays are not possible under the prior art, and provide the present invention with the advantage of a unique viewpoint in which weather information display is viewed.

Figure 5:
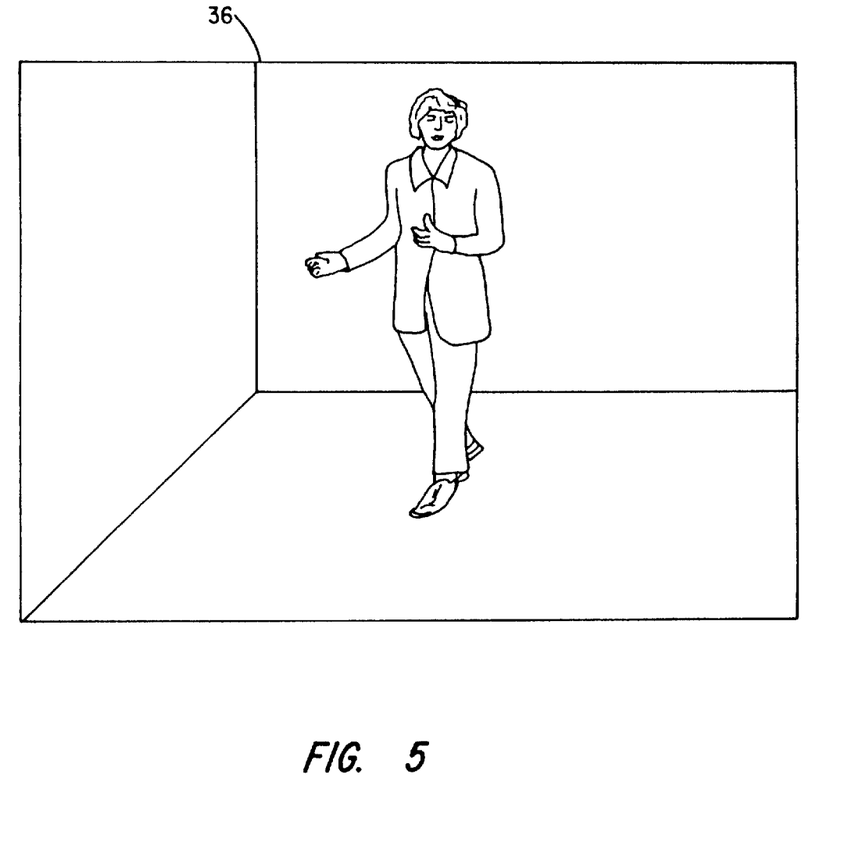
FIG. 5 is an exemplary representation of a virtual set according to one embodiment of the invention.

The basic process followed by a preferred embodiment of the invention is shown by reference to a number of exemplary representations. Referring first to FIG. 5, an exemplary representation of a virtual set according to one embodiment of the invention is shown. A virtual set includes a subject against a background of a solid color. As shown in FIG. 5, weather forecaster 34 is the subject, and is shown in room or portion thereof 36, that is painted a solid color. Such a virtual set provides for ideal conditions for what is known in the art as chroma-keying. The generation of a virtual set such as that shown in FIG. 5 is therefore the first step of the basic process followed by the preferred embodiment.

Figure 6:
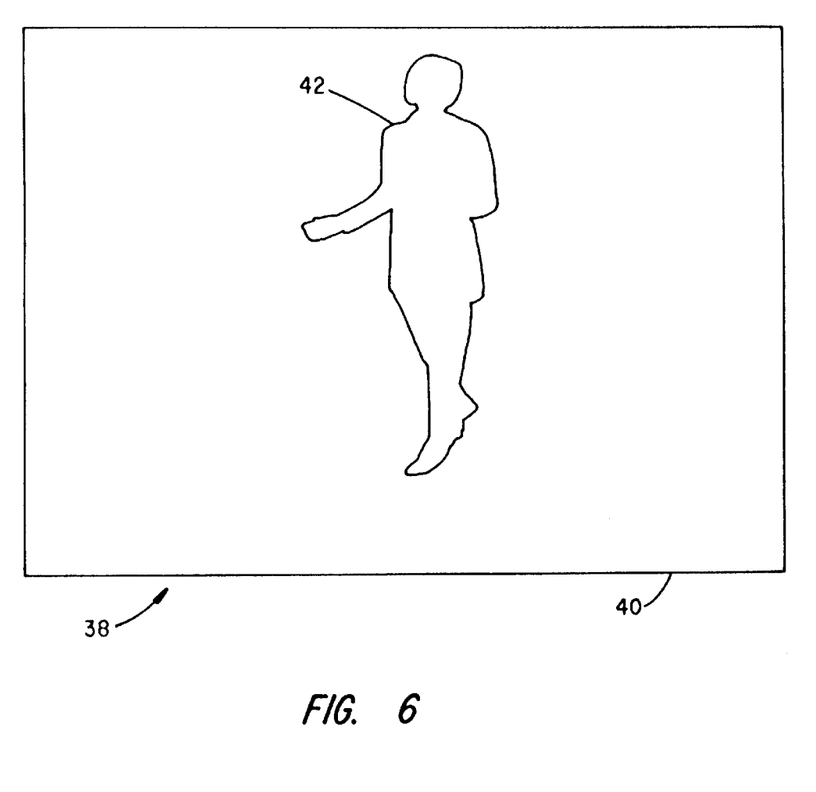
FIG. 6 is an exemplary representation of a chroma-key mask according to one embodiment of the invention.

Referring next to FIG. 6, an exemplary representation of a chroma-key mask according to one embodiment of the invention is shown. Mask 38 is a two-color image of parts 40 and 42. Part 42 corresponds to the subject of the virtual set, and is completely white. Part 40 corresponds to the background against which the subject of the virtual set is shown, and is completely black. In other words, mask 38 is a corresponding representation to the virtual set of FIG. 5 in which the subject is completely whitened, and the rest of the virtual set is completely darkened. The generation of the chroma-key mask is the second step of the basic process followed by the preferred embodiment.

Figure 7:
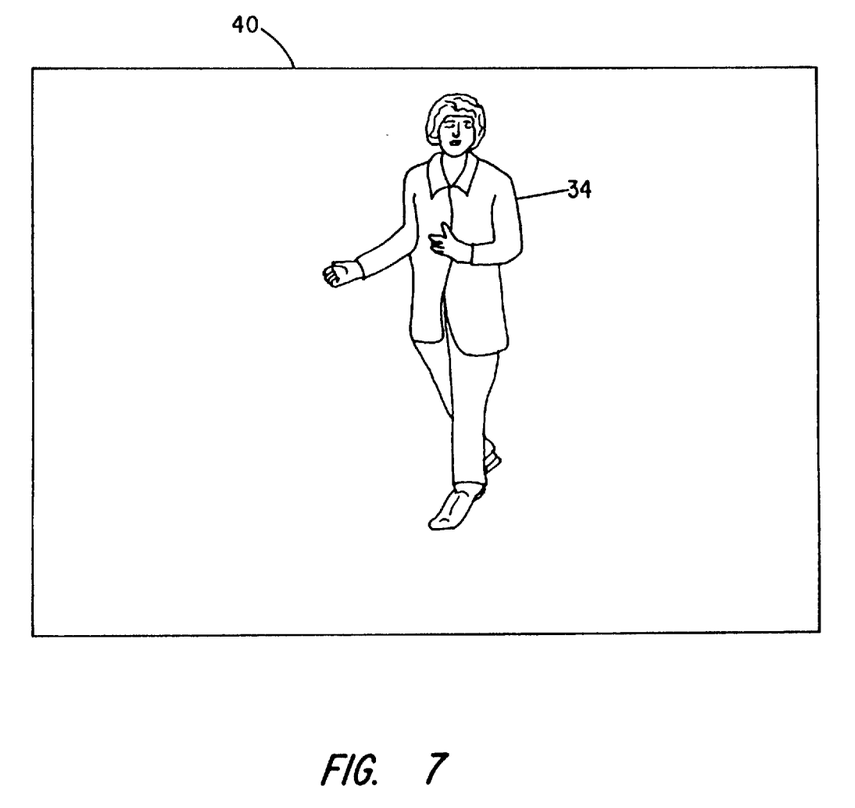
FIG. 7 is an exemplary representation of a chroma-keyed subject according to one embodiment of the invention.

Referring next to FIG. 7, an exemplary representation of a chroma-keyed subject according to one embodiment of the invention is shown. As shown in FIG. 7, subject 34 of the virtual set of FIG. 5 is placed on part 40 of mask 38 of FIG. 6. The chroma-keyed subject is the subject of the virtual set placed into the corresponding chroma-key mask; in other words, the image of the subject 5 viewed in full color except that the background is completely keyed out. In a preferred embodiment, the resulting chroma-keyed subject is generated as a two-dimensional texture memory, such that the texture memory comprises a digital representation of only the subject, and not of its background within the virtual set. The generation of this texture memory is the third step of the basic process followed by the preferred embodiment.

In a fourth step of the basic process followed by the preferred embodiment, the chroma-keyed subject is laid on top of a computer-generated weather display, the final results of which have already been exemplarily shown in FIG. 3 and FIG. 4. That is, the texture memory is mapped onto computer-generated weather-related information. Although the subject weather forecaster is placed into a three-dimensional virtual weather scene to give the effect of the subject actually be into the scene, the actual video of the subject of the subject forecaster (viz., the texture memory) is placed onto the scene as a flat object. This approximates the illusion of three-dimensional interaction between the subject and the weather display because the viewpoint used is such a great distance from the subject. In a fifth step of the basic process followed by the preferred embodiment, the resulting weather-related information including the mapped texture memory is displayed on a display device, such as a television or a video monitor.

Figure 8:
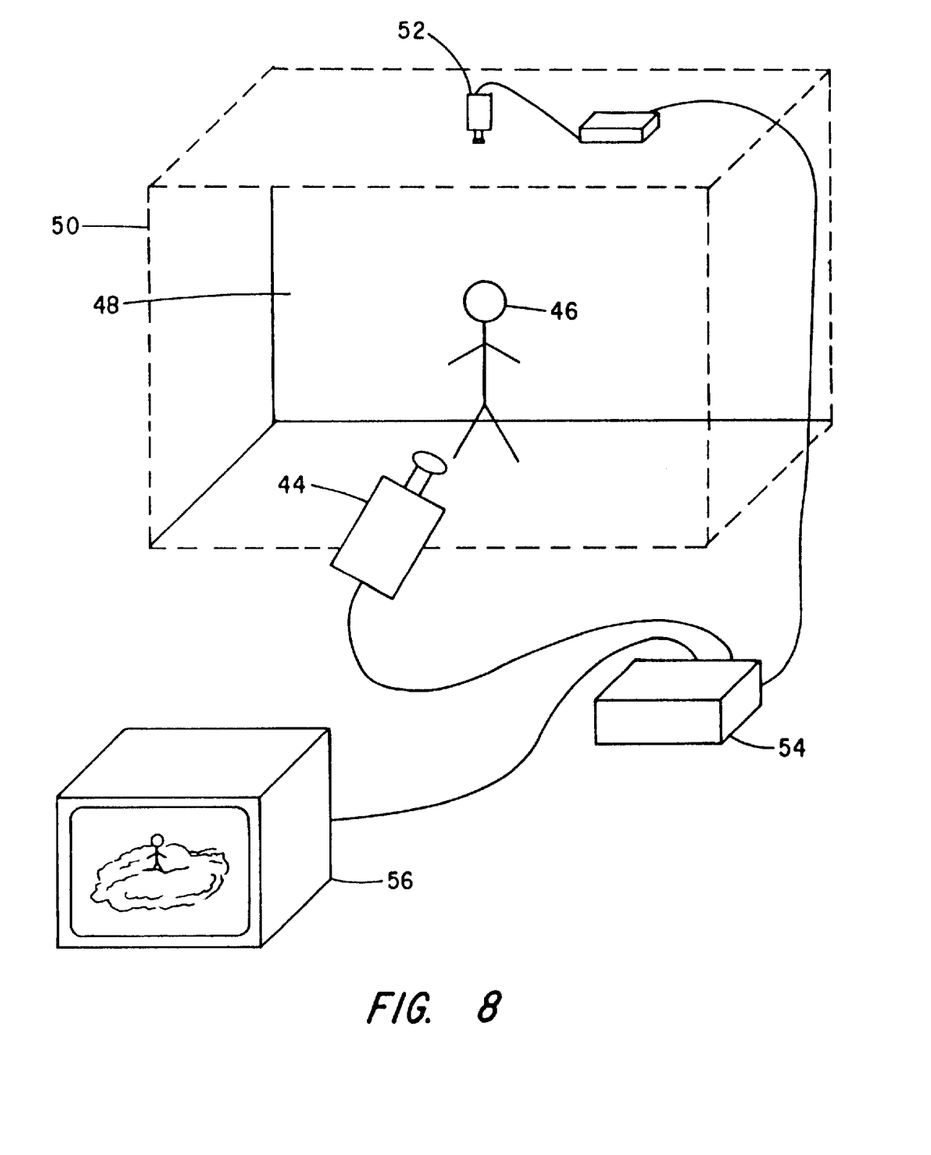
FIG. 8 is an overview diagram of a system according to an embodiment of the invention.

Referring now to FIG. 8, an overview diagram of a system according to an embodiment of the invention is shown. Studio camera 44 records weather forecaster 46 against blue background 48 of studio 50. This live video, along with a feed from vision system 52 that permits the invention to track the x–y position of the weather forecaster (i.e., the position of the forecaster in room 50) is fed into system 54, which performs the steps already described. System 54 provides a video out feed which shows forecaster 46 integrated within weather-related information on a display device 56.

The basic process of a preferred embodiment of the invention has been described. The individual steps of the basic process are described in more detail in the following sections.

Generating a Virtual Set and Generating a Chroma-Keyed Mask

Figure 9:
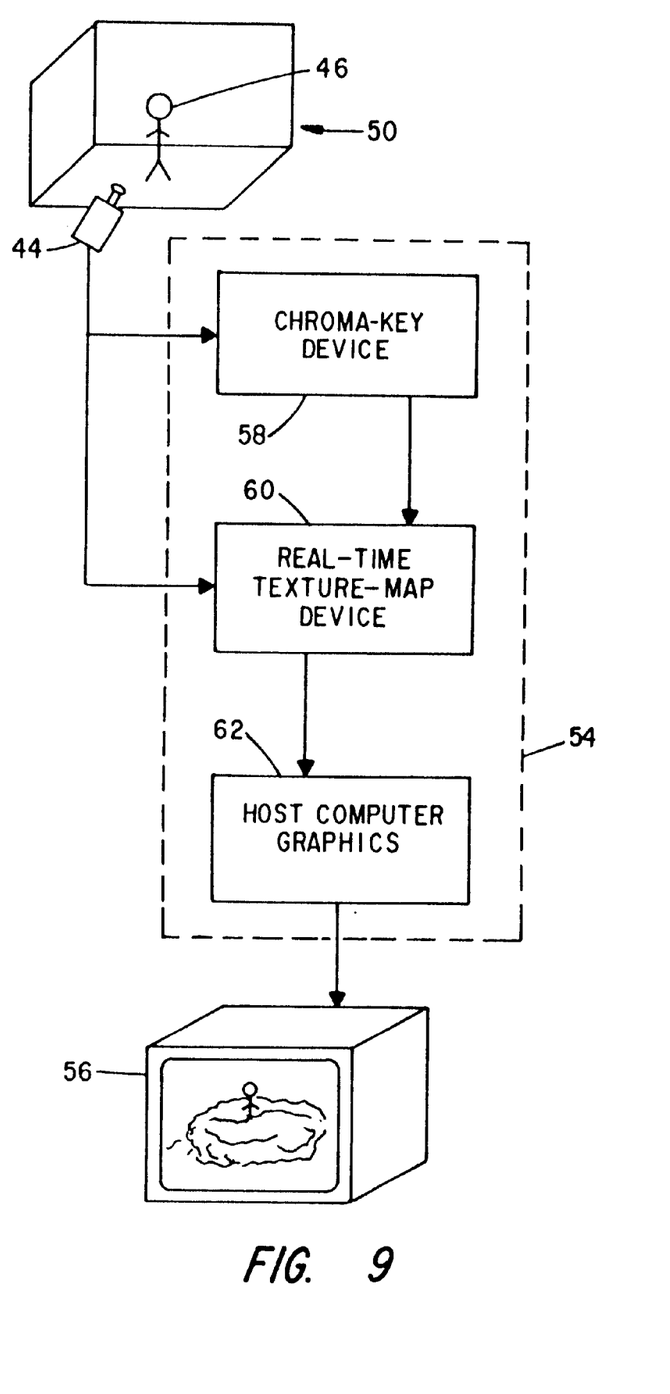
FIG. 9 is a diagram showing a more detailed view of the embodiment of FIG. 8.

Referring to FIG. 9, a diagram showing a more detailed view of the embodiment of FIG. 8 is shown. The input video source, as recorded by camera 44, requires the weather forecaster 46 preferably in front of a blue background (e.g., background 48 of FIG. 8, not particularly shown in FIG. 9). In order to achieve the best possible effect, this blue screen preferably covers the entire back wall and the floor on which the forecaster will perform. Camera 44 is preferably positioned so that the entire body of the forecaster is shot over the blue screen. The forecaster is able to move freely within this blue background set (e.g., as detected by vision system 52 of FIG. 8, also not particularly shown in FIG. 9). The output of camera 44 is what has been described in conjunction with FIG. 5 as the virtual set.

The output video signal from camera 44 is input into keying device 58. Note that keying device 58, real-time texture mapping device 60, and graphics processors 62 are all constituent parts of system 54 that has already been described. The keying device 58 applies a binary chromakey operation that breaks the full color video signal into a binary video stream. The binary stream has the forecaster as full white and the background as full back, as has been described. This mask is used to determine where the forecaster is against the blue background in real time. The output of keying device 58 is the mask output, as has been described, which is then input to real-time texture map device 60 as the alpha input.

Figure 10:
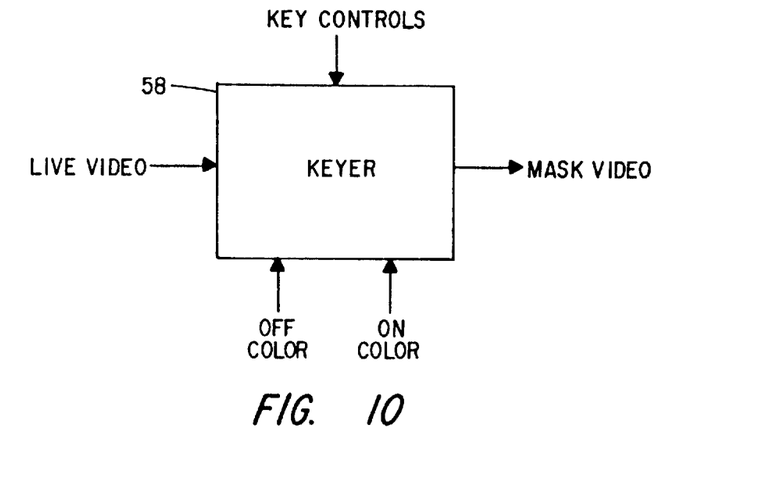
FIG. 10 is a block diagram of a chroma-key device of one embodiment of the invention.

Referring to FIG. 10, a block diagram of a chroma-key device of one embodiment of the invention is shown in more detail. The live video input is the video signal from a camera. The key controls are input from the user of the invention, to adjust the chroma-key device in accordance with the environment of the room in which the weather forecaster is being taped, and to otherwise fine-tune the process. The on color in the preferred embodiment is white, while the off color is preferably black. Note that the output shown in FIG. 10 as the mask video is what has been described in conjunction with FIG. 6 as the chroma-key mask.

Generating a Texture Memory of the Virtual Set

Referring back to FIG. 9, after a virtual set has been generated by video camera 44, and a chroma-key mask has been generated by chroma-key device 58, both of these signals are fed into the real-time texture map device 60. The mask output of device 58 is input as the alpha input (shown in FIG. 6), and the video feed output of camera 44 is input as the video input (shown in FIG. 5). Texture map device 60 converts those parts of the video feed that correspond to the on color of the alpha input to a texture memory, which is a digital representation of the weather forecaster stored in the memory of the computer in a format having the ability to be manipulated by the graphics processors of the computer.

The process of converting the video to texture memory is updated thirty times per second, and the texture memory itself has a color depth of thirty-two bits per pixel. It should be noted that the size of the video image that is placed into texture memory can be reduced on the fly before it is placed into texture memory, depending on the requirements of the final virtual set. The output of device 60 is fed as texture memory of graphics processors 62. The output also is what has been described in conjunction with FIG. 7 as the chroma-keyed subject.

Figure 11:
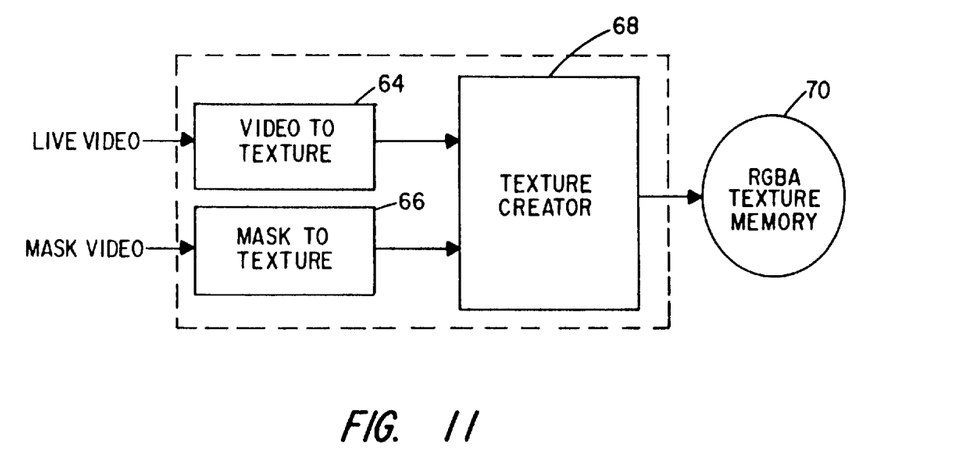
FIG. 11 is a block diagram of a real-time texture map device of one embodiment of the invention; and, FIG. 12 is a block diagram of a host computer graphics processor according to one embodiment of the invention.

Referring to FIG. 11, a block diagram of a real-time texture map device of one embodiment of the invention is shown in more detail. Within device 60, both live video and the mask video are converted to texture memory, as represented by elements 64 and 66. The resulting texture memories are fed into texture creator 68, which inserts those parts of the live video onto the portions of the texture memory corresponding to the on color. The resulting output is the RGBA texture memory 70.

The RGBA texture memory includes an image defined by pixels having four components. The components are R (the red channel), G (the green channel), B (the blue channel), and A (the alpha channel). The R, G, and B components are standard components of what those skilled in the art understand to be an RGB signal, varying the specific components of which allowing for different colors to be displayed. The alpha channel is similar to a mask channel. The greater the value in the alpha channel, the more opaque the pixels are. When an object, with a texture applied to it, is placed in a scene, the pixels with an alpha of zero are totally transparent. Pixels with a maximum alpha are totally opaque.

Mapping the Texture Memory onto Weather-Related Information

Referring back to FIG. 9, the texture output of real-time texture map device 60 is fed as the texture memory input of graphics processors (that is, one or more graphics processors) 62. Graphics processors 62 map the texture memory of the live feed output onto a computer-generated weather display. Processors 62 accomplishes this by generating a weather display, and then outputting the video to monitor 56. Exemplary output has already been described in conjunction with and is shown in FIG. 3 and FIG. 4.

Figure 12:
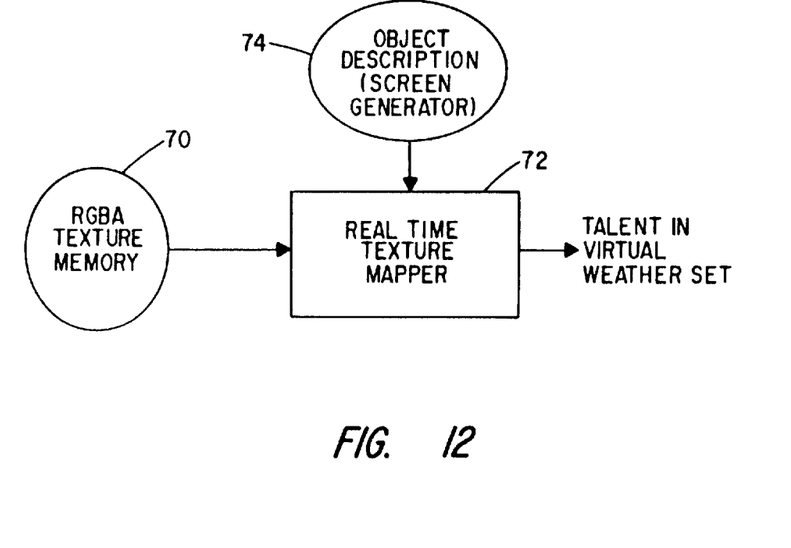

Referring to FIG. 12, a block diagram of a host computer graphics processor according to one embodiment of the invention is shown in more detail. RGBA texture memory 70 is mapped by the graphics processors onto a flat object according to a description of the object (represented by element 74) that is in the three-dimensional weather map. This mapping (represented by element 72) occurs at a video frame rate of thirty frames per second. The flat object is placed and moved through the scene based on user specifications. Because the texture memory contains the full thirty-two bit red, green, blue and alpha information, only the full color image of the forecaster is observed in the virtual weather scene. The resulting output is the weather forecaster in the virtual weather set, that is, the computer-generated weather display.

Computer-Generated Weather Display

The weather display onto which the RGBA texture mapper maps the RGBA texture memory of the video feed of the weather forecaster is computer generated (e.g., by the computer of FIG. 1 and FIG. 2). In one embodiment, the weather display is generated in accordance with the '215 patent, previously incorporated by reference. The invention is not so limited, however. What follows is a basic description of such virtual three-dimensional weather-related environments, as known by those of ordinary skill within the art. Although this is a description of a preferred embodiment of the invention, any virtual three-dimensional weather-related environment is amenable to the present invention.

The virtual three-dimensional environment includes a set of polygons, points, lines, and/or shapes within a computer. The elements of this set can be given characteristics of color, transparency and texture to represent a real or artificial environment. These elements are made to have three dimensions. The elements are stored in the computer so that the view of the environment can be changed in perspective and in orientation. The environment includes terrain that represents real or imaginary land, foliage, water, and/or space. The environment can also include weather and physical phenomenon such as, but not limited to, clouds, rain, snow, jet streams, and tornadoes. It may also include man-made objects such as, but not limited to, buildings, bridges and streets. Additionally, the environments may be made to include notations or symbols that would be made to augment the scene (these may include, but are not limited to, warm or cold fronts, city names, temperature plots, symbols and models (e.g., planes, cars, etc.)). All parts in the environment are referred to as elements.

The invention preferably displays the terrain in the environment by taking in terrain information from Digital Elevation Models ("DEMs") that represent the earth at various resolutions (e.g., five thousand meters, ten thousand meters, etc.). With this information the invention builds a lattice in the computer to represent the data taken from the DEMs.

The invention preferably displays the lattice at varying degrees of resolution by sampling the data from the DEMs and displaying ever vertice, every other vertice, every third vertice, etc., depending on parameters set by the user. The lattice can be colored at teach vertice to create the color of the terrain. Optionally, a texture map, which is a two-dimensional array of pixel information for a particular pattern, can be applied to the entire lattice. However, application of a texture map does not require the lattice to be at full resolution to view the full resolution of the terrain.

The invention preferably displays weather phenomenon in the environment by taking in satellite, radar and artificial data. Such artificial data can be calculated from weather models known within the art or from data that is specifically created to achieve a certain visual effect, as is also known within the art. The invention then preferably creates a lattice or volume at varying degrees of resolution depending on parameters set by the user. This data can be updated from a remote location that either takes in real satellite or radar information. The lattice or volume can be colored at each vertice to create the color of the weather phenomenon. Optionally, a texture map can be applied to the entire lattice;

again, however, application of a texture map does not require the lattice to be at full resolution to view the full resolution of the given weather phenomenon.

The invention preferably has the ability to display cities in the environment that are composed of elements such as buildings, streets, signs, etc. This is accomplished by the computer system loading in models of a real or imaginary city and then displaying them on top of the terrain. These models can either be complex polygonal shaped models in which the shape of the model is achieved by making polygons that correspond to real or imagined parts of the model's focus. Alternatively, the models can be simple shapes that have textures put on them that represents pictures of the model's focus.

The invention preferably also provides for the display of simple shapes, symbols, generic models (e.g., cars, planes, animals, etc.) and textual data in order to augment or annotate the environment or display important information about the environment or what it represents. This effect is achieved by creating a two- or three-dimensional model of the simple shapes, symbol, generic models or text and placing it in the environment a location of the user's choice. Additionally, the simple shapes, symbols, generic models and textual data can be represented by textures on simply polygons of the object they represent.

The elements of the environment are preferably stored in the random access memory of the computer (e.g., RAM 20 as shown in FIG. 2). Organizationally, the elements are stored in what those skilled the art understand as an object-oriented manner, in a scene graph. A scene graph has a hierarchical structure like that of a tree. Each element of the scene graph can be referred to as a leaf. Several elements (leaves) can be grouped which can then be referred to as branches. In addition, the scene graph as a whole can be viewed as an entire tree. This permits logical access to the elements as well as fast editing (removing a branch removes all the leaves therein).

The elements stored in the random access memory are preferably capable of being individually animated. An animation is composed of a set of way points that as a set compose a specific animated route. A way point is a point in the path of motion of an element, and denotes a specific time goal or change of direction. An animation can be as simple as spinning around an axis or it can be a set of way points that define a complex motion. Each element in the environment keeps track of its own animation, preferably. However, the internal timing of the computer preferably synchronizes the entire animation.

The entire environment is preferably viewed from a point within or without the environment, known as the scene camera. The scene camera is defined by a three-dimensional position, the orientation, including yaw, pitch and roll, as well as a field of view (for example, the aperture of the camera). The scene camera is similar to other elements in that it can be moved and animated within the environment. The scene camera represents the viewpoint from which the user is able to view the entire graphic display of the monitor.

Conclusion

An interactive, weather forecaster-immersive, three-dimensional weather visualization system and method has been described. Although specific embodiments have been illustrated and described herein, it will be appreciated by those of ordinary skill within the art that any arrangement which is calculated to achieve the same purpose may be substituted for the specific embodiments shown. This application is intended to cover any adaptations or variations of the present invention. For example, the invention has been shown substantially with respect to a weather forecaster or other subject immersed in weather-related information. However, the invention is not so limited. The immersion of any subject, in any type of earth sciences-based information, or other information, is also within the scope of the invention. It is manifestly intended that this invention be limited only by the claims and equivalents thereof

I claim:

1. A method for visually displaying weather-related information on a video display in a three-dimensional animated fashion comprising the steps of:
   a. generating signals representative of the changing x–y position of a subject as the subject moves within a three-dimensional background of a single color;
   b. generating a virtual set of said subject moving within said three-dimensional background using a video camera;
   c. generating a chroma-keyed mask based upon said virtual set;
   d. using a real-time texture map generator to create a textured memory based upon said virtual set and said chroma-keyed mask;
   e. creating a computer-generated weather display using weather data;
   f. combining said textured memory, weather display and signals representative of the changing position of said subject to create a real-time animation depicting the subject moving about said weather display; and
   g. displaying said animation on a video display.

2. The method of claim 1 wherein said weather data is satellite weather information.

3. The method of claim 1 wherein said weather data is radar weather information.

4. The method of claim 1 wherein said weather data is derived from a plurality of sources.

5. The method of claim 1 wherein said signals representative of the changing position of the subject are used to alter the position of the subject in the animation.

6. The method of claim 1 wherein said animation is displayed on the video display from the point of view of a virtual scene camera located at a defined location.

7. The method of claim 6 wherein the virtual scene camera can be moved and animated three-dimensionally within the animation.

8. The method of claim 6 wherein the field of view of the virtual scene camera is adjustable.

9. The method of claim 6 wherein the yaw, pitch and roll of the virtual scene camera is adjustable.

10. The method of claim 1 wherein a three-dimensional background is a portion of a room having a solid color.

11. The method of claim 1 wherein the chroma-keyed mask comprises a two-color image, a first part of the image corresponding to the subject in a first color, and a second part of the image corresponding to said three-dimensional background in a second color.

12. The method of claim 1 wherein the texture memory comprises a digital representation of only the subject.

13. The method of claim 1 wherein the texture memory is generated in real-time.

14. A method for interactively immersing a subject in a three-dimensional display of computer-generated, weather-related information, comprising the steps of:
   a. tracking the movement of the subject within a three-dimensional, solid color background and generating tracking signals representative of said movement;
   b. chroma-keying a video feed of the subject moving within a three-dimensional solid colored background to generate a chroma-keyed mask comprising an image of the subject having a color corresponding to an on color against a background having a color corresponding to an off color;

c. mapping the video feed to a texture memory in real-time using the chroma-keyed mask as an alpha input, wherein the texture memory comprises a digital representation correspond to the subject; and d. mapping the texture memory of the video feed onto a three-dimensional display of weather-related information generated by a computer such that the subject appears to have become a part of and move about the three-dimensional display, said tracking signals being used to coordinate the position of the subject with respect to the three-dimensional display as the subject moves within the three-dimensional solid color background.

15. The method of claim 14 further comprising the step of displaying the three-dimensional display of computer-generated, weather-related information including the mapped texture memory on a display device.

16. The method of claim 14 wherein the digital representation of the subject comprises a plurality of pixels, each pixel having a red channel component, a blue channel component, a green channel component, and an alpha channel component.

17. A weather visualization system comprising:

a. a three-dimensional, single-color background in which a subject can move about;

b. a sensor for tracking the x–y position of a subject as it moves with said three-dimensional single-color background;

c. a chroma-key device to generate a mask based on a video feed including a subject against said three-dimensional single-color background;

d. a texture map device utilizing the mask as an alpha input to generate a texture memory based on the video feed; and e. at least one graphics processor to map the texture memory onto a three-dimensional display of weather-related information-based upon the position of the subject as it moves about said three-dimensional single-color background.

18. The system of claim 17 further comprising a display device to display the three-dimensional display of weather-related information including the mapped texture memory.

19. The system of claim 17 wherein the video feed is a live video feed.

20. The system of claim 17 wherein said mask has a subject color corresponding to an on color and a background color corresponding to an off color.

21. The system of claim 17 wherein the texture map device generates the texture memory in real-time.

22. The system of claim 17 wherein the texture map device digitizes the video feed as a first intermediate texture memory and the mask as a second intermediate texture memory.

23. The system of claim 17 wherein the at least one graphics processor maps the texture memory onto the three-dimensional display of weather-related information such that a subject in the video feed appears to be located within and move about the three-dimensional display.

24. A computerized system for visually displaying weather-related information comprising:

a. means for tracking the position of a subject as the subject moves within a three-dimensional background;

b. means for generating a virtual set of said subject;

c. means for generating a chroma-keyed mask based on the virtual set;

d. means for generating a memory of the virtual set based on the chroma-keyed mask;

e. means for mapping the texture memory onto the weather-related information based upon the position of the subject as the subject moves within the three-dimensional background; and f. means for displaying the weather-related information including the mapped texture memory.

25. The computerized system of claim 24 wherein the virtual set comprises the image of the subject in a three-dimensional, single-color background.

26. The computerized system of claim 25 wherein the chroma-keyed mask comprises a two-color image, a first part of the image corresponding to the subject in a first color, and a second part of the image corresponding to said background in a second color.

27. The computerized system of claim 24 wherein the texture memory comprises a digital representation of only the subject.

28. A computerized system for interactively immersing a subject in a three-dimensional display of computer-generated, weather-related information, comprising:

a. means for chroma-keying a video feed of the subject against a solid-colored, three-dimensional background to generate a chroma-keyed mask comprising an image of the subject having a color corresponding to an on color against said background having a color corresponding to an off color;

b. means for mapping the video feed to a texture memory in real-time, using the chroma-keyed mask as an alpha input, wherein the texture memory comprises a digital representation corresponding to the subject, the digital representation comprising a plurality of pixels;

c. means for tracking the position of the subject as the subject moves within said solid-color, three-dimensional background; and d. means for mapping the texture memory of the video feed onto the three-dimensional display of computer-generated, weather-related information based upon the position of the subject within said solid-color, three-dimensional background, such that the subject appears to have become a part of the three-dimensional display of computer-generated, weather-related information.

29. The computerized system of claim 28 further comprising means for displaying the three-dimensional display of weather-related information generated by a computer including the mapped texture memory.

30. The computerized system of claim 28 wherein each pixel has a red channel component, a blue channel component, a green channel component, and an alpha channel component.

31. The computerized system of claim 28 wherein said means for tracking generates signals used to scale appearance of the subject with respect to the three-dimensional display.

32. The computerized system of claim 28 wherein said three-dimensional display is viewed from the perspective of a virtual scene camera located at a defined position.

33. The computerized system of claim 28 wherein the virtual scene camera can be moved and animated three-dimensionally within the three-dimensional display.

34. The computerized system of claim 28 wherein the field of view of the virtual scene camera is adjustable.

35. The computerized system of claim 28 wherein the yaw, pitch and roll of the virtual scene camera is adjustable.

* * * * *

UNITED STATES PATENT AND TRADEMARK OFFICE
CERTIFICATE OF CORRECTION

PATENT NO. : 6,052,648
DATED : April 18, 2000
INVENTOR(S) : Craig R. Burfeind, et al It is certified that error appears in the above-indentified patent and that said Letters Patent is hereby corrected as shown below:

Column 9, claim 17(e), line 37, delete "information-based" and insert -- information based --.

Signed and Sealed this

Thirteenth Day of February, 2001

Attest:

NICHOLAS P. GODICI

*Attesting Officer*  *Acting Director of the United States Patent and Trademark Office*